Nov. 20, 1956    K. B. BREDTSCHNEIDER ET AL    2,771,498
ELECTRODE FEED OR DRIVE MECHANISM
Filed April 18, 1955    3 Sheets-Sheet 1
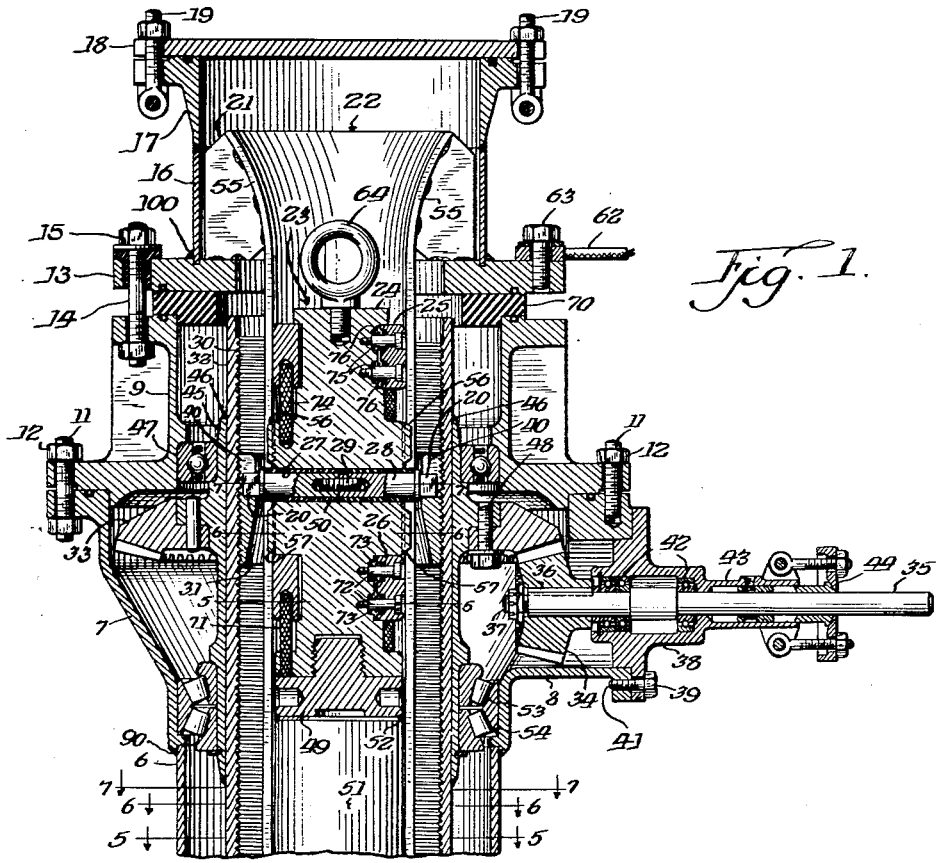
Fig. 1.
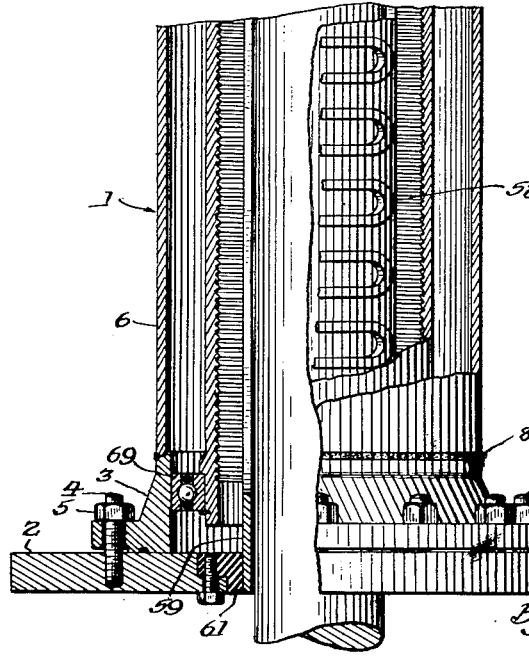
Inventors.
Kurt B. Bredtschneider, &
Frank M. Onak.
By Joseph O. Lange
Atty.

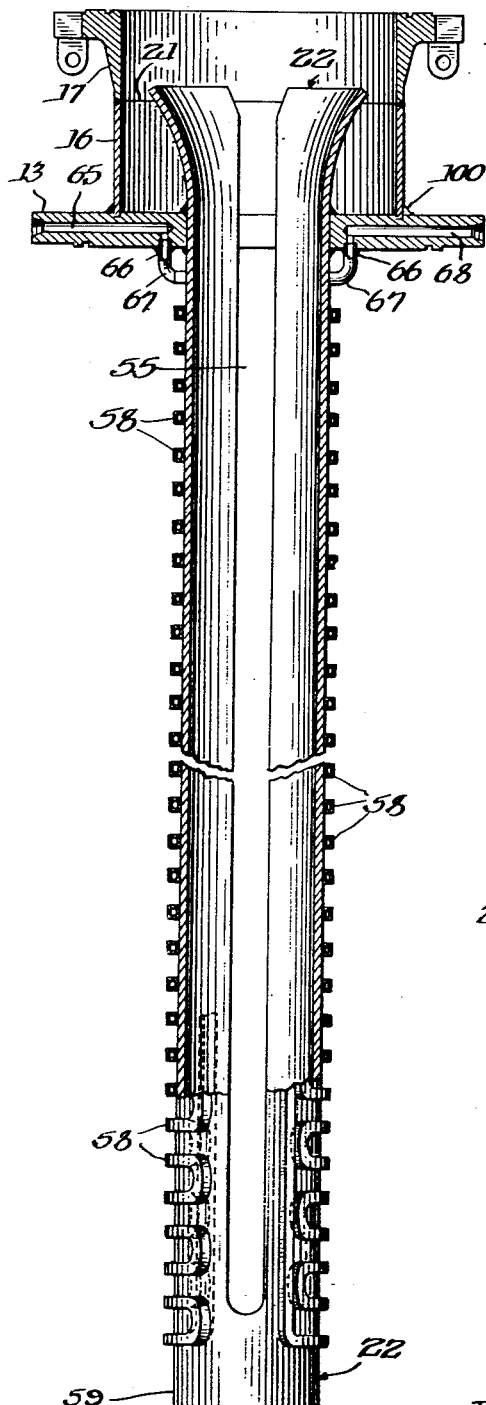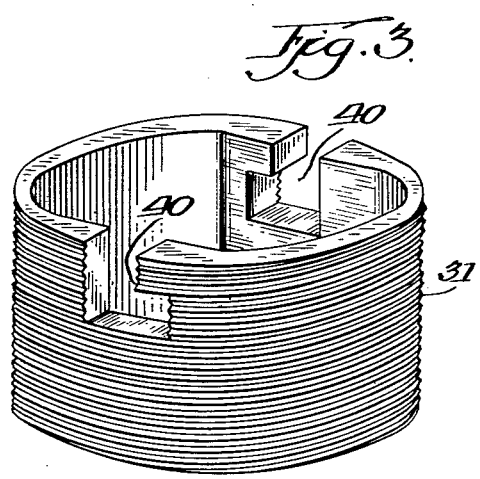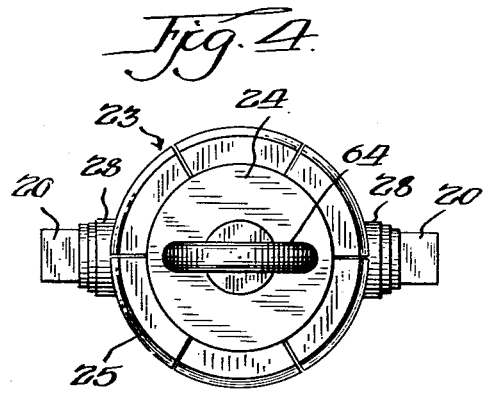

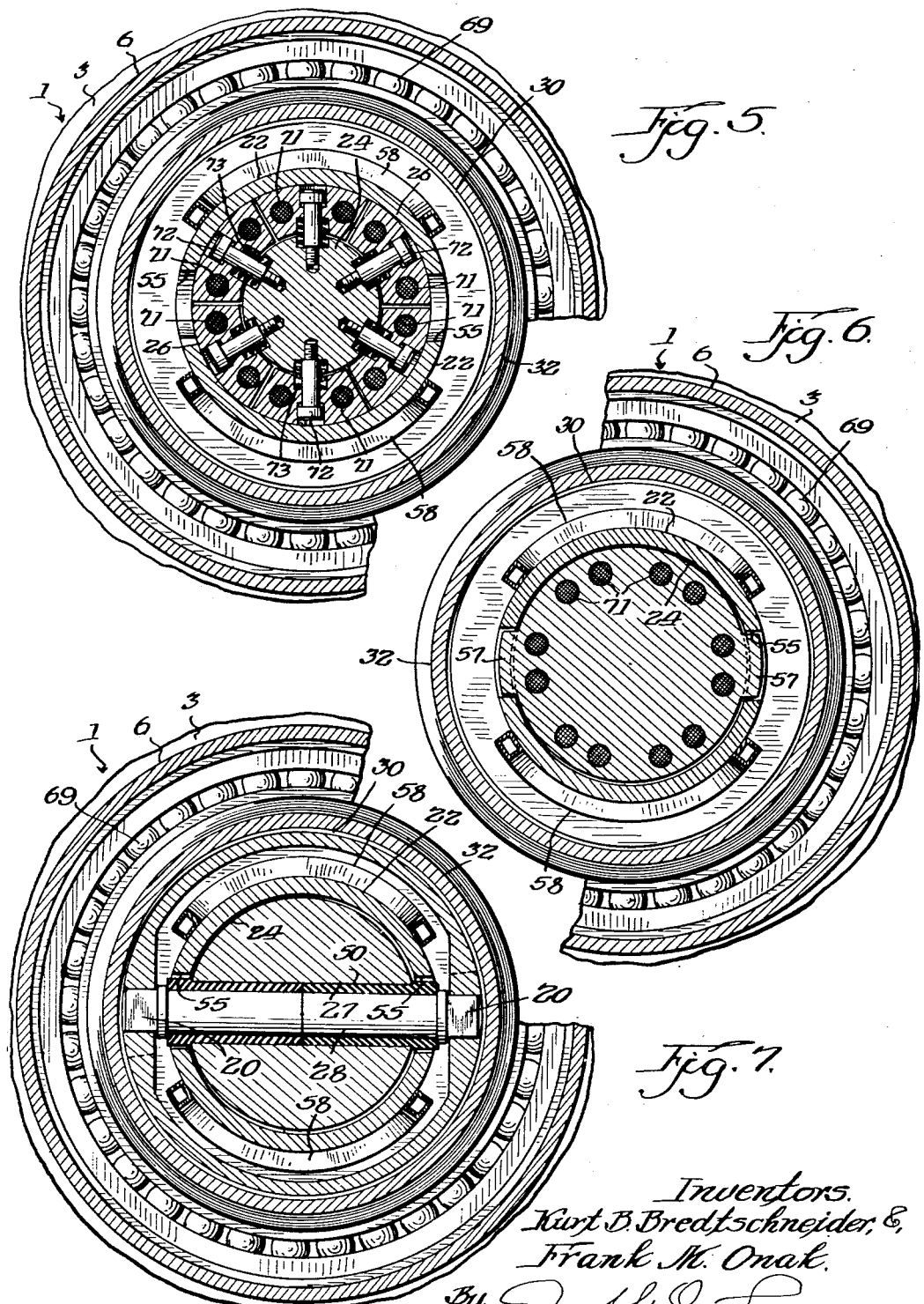

United States Patent Office 2,771,498
Patented Nov. 20, 1956

2,771,498

ELECTRODE FEED OR DRIVE MECHANISM

Kurt B. Bredtschneider and Frank M. Onak, Chicago, Ill., assignors to Crane Co., Chicago, Ill., a corporation of Illinois Application April 18, 1955, Serial No. 502,070

18 Claims. (Cl. 13—14)

This invention relates generally to a novel feed or drive mechanism for an electric arc melting furnace, such as the type, for example, useful in the melting or titanium and like metals. More particularly, the invention is concerned with an electrode drive for such type of furnace.

One of the more important objects of this invention is to provide for an electrode feed structure affording a relatively short overall length of the melting furnace and presenting an easy access arrangement to the electrode for replacement as well as providing a substantial and trouble-free electrode drive.

A further object is to provide an efficient and durable electrode feed device in which by a relatively simple rotatable means axial movement may be imparted to the electrode.

Heretofore, it has been a problem to provide a positive feed device in which the electrode can be fed to the furnace, while at the same time permitting the use of a retaining cylinder around the electrode which cylinder is preferably cooled on the outside wall thereof by means of water or other suitable cooling media.

Other objects and advantages of this invention will become more readily apparent upon proceeding with a description of the novel mechanism read in accompaniment with the attached drawings, in which Fig. 1 is a fragmentary sectional assembly view of a preferred form of the electrode feed means embodying our invention.

Fig. 2 is a fragmentary external view of the cooled cylinder embodying our invention.

Fig. 3 is a perspective view of a novel form of the drive bushing employed.

Fig. 4 is a plan view of the electrode holder cooperating with the drive bushing described in connection with Fig. 3.

Figs. 5, 6 and 7 are magnified sectional views taken on the lines 5, 6 and 7 respectively of Fig. 1 in the several planes indicated thereon.

Similar reference numerals refer to similar parts throughout the several views.

In referring now to the assembly in Fig. 1, the electrode feed device or drive mechanism of our invention comprises an outer casing generally designated 1 which consists primarily of a base or supporting flange 2 and having bolted thereto on the upper side thereof a floor flange 3 attached thereto by means of a plurality of threaded studs 4 and held in position by means of nuts 5.

Weldably annularly or otherwise secured as at 80 to the upper end of the flange 3 is the cylindrical housing 6 which for convenience of reference is shown in a broken section as indicated. At the upper end of the latter mentioned housing the upper casing portion 7 is attached as at 90 having at one side limit thereof a transverse projecting hollow portion 8 for support of an actuating mechanism as hereinafter described in greater detail. Cooperating with the casing 7 is the bearing housing 9 attached to the casing 7 by means of the bolts 11 and the nuts 12. In leakproof and also in insulated relation as at 70 to the said bearing housing 9 for reasons hereinafter to become apparent, the top flange 13 is attached to member 9 by means of the bolts 14 and nuts 15. Weldably secured to the latter mentioned flange, an end enclosure assembly is provided comprising a cylindrical housing 16 having at the upper end thereof a flanged member 17 in which on its periphery as indicated a suitable number of radially extending slots are provided to receive the eye bolts 19 for a quick and convenient assembly and disassembly of the feeder housing.

The foregoing wording describes generally the outer framework or structure comprising the housing for containing the mechanism comprising the electrode drive. Supported therewithin by means of radially extending ribs 21 and welded as shown to an upper surface of the flange 13 is a preferably funnelled type of cylindrical liner 22 which serves as a means for receiving the electrode holder generally designated 23. The latter member consists primarily of a head 24 carrying thereon the upper and lower spring-loaded contact shoes 25 and 26 for effecting electrical contact as hereinafter explained.

At a central portion thereof, the head 24 is preferably drilled transversely as at 27 to receive the insulated pin 28 extending diametrically across 24 and which pin consists of a pair of members attached to the said head 24 and as indicated is held in locked position by means of a threaded stud 29.

As shown more clearly in Fig. 5, a plurality of annularly arranged pins 71 hold the lower shoe 26 on the member 24 against rotation relative to the electrode coupling 49, while the pins 74 similarly arranged function likewise to hold the upper shoe 25 against rotation relative to the member 23.

It should be noted that the oppositely disposed end limits of the pin 28 are preferably of square or other polygonal form as at 20 for engaging locking slots 40 (more clearly shown in Fig. 3) in the threaded drive bushing or ring nut 31. As shown in Fig. 1, the said drive bushing 31 threadedly engages the internal threads 30 of the feed liner 32. The latter member is rotatable with relation to the outer housing previously described.

In order to provide for the aforesaid relative rotatability and thus feed (lower) the electrode 51 into the furnace (not shown), it should be noted that the threaded liner 32 is attached as by means of the weld to a driven gear 33 maintained in meshed relation to a drive gear or pinion 34. The latter drive gear is journally mounted within the housing side extension casing 8 and is non-rotatably attached to the drive stem or shaft 35 by means of the key 36 and held in place by the locknut 37.

It will, of course, be appreciated that as to the driving means employed, the stem 35 may be suitably attached to any actuating devices such as an electric motor, fluid motor, or other suitable driving means. The stem 35 is held in fluid sealing relation to the extension casing 8 by means of a housing 38 bolted thereto by the usual employment of the annularly arranged nuts 39 and the bolt studs 41. Conventional roller bearings 42 function to facilitate the rotation of the shaft 35 under the influence of an electric motor or other drive as previously mentioned. Suitable fluid sealing means such as the stuffing box 43 with packing held in place by means of flanged gland 44 are used as in the ordinary case of a valve stem or shaft packing. The driven gear 33 is preferably bolted to the elongated ring or cylindrical portion 45, which latter member is weldably attached at 46 to the threaded cylinder 32.

Around the elongated ring, a suitable roller bearing as at 47 provides for the easy rotation in substantially frictionproof relation between the said ring member 45 and the housing 9. Preferably the gear 33 for convenience of replacement is pinned and secured to the elongated ring member 45 by means of the bolts 48 applied to the integral flange as indicated. It will, of course, be understood that under certain conditions, the driven gear 33 may be made as an integral part of the ring member 45.

It should, of course, be appreciated that the cylinder 32 is preferably threaded for its entire length on its inner wall as shown in order to allow for the longitudinal travel of the electrode coupling or holder 49 and the electrode 51 upon rotation of the said cylindrical threaded member or sleeve member 32. At the lower end portion of the head 24 and preferably attached in non-rotatable relation therewith is the attaching coupling 49 welded or otherwise secured to the electrode 51. The welded attachment is effected by means of the weld 52. Engaging an annular shoulder of the ring 45, a combination of thrust bearing and roller bearing support the member 45 as provided at 53 and 54 respectively, being shouldered within the housing portion 7.

The funnelled liner 22 is shown more clearly in Fig. 2 and is slotted at 55 for substantially its entire length. The said latter slot functions as the means for engagement by the projecting ribs oppositely disposed as at 56 and 57 in different planes on the head 24 to hold the latter against rotation while permitting the axial feed movement toward the electric furnace. The funneled cylinder 22 is preferably insulated, water-jacketed or otherwise cooled by suitable media to keep the relatively high temperatures of the electrode and holder from adversely affecting the parts and material of the equipment associated therewith. This is done by means of hollow members such as spirally extending tubes or coils shown at 58 (also see Fig. 2). The said arrangement of hollow baffles or coils around the outer surface of cylinder 22 for substantially its full length permits of an adequate distribution of the cooling media around the said cylinder thereby to maintain the latter member at suitable relatively low temperatures for the reasons stated At the lowermost end portion of the liner 22, and as more clearly shown in Fig. 1, a solid annular bearing 59 is provided within the annular bearing insulator member 61 molded and fitted to the base flange 2 as indicated.

In order to provide the electrode with the necessary high temperatures required for melting, a suitable electrical contact preferably on the flange 13 is provided as at 62 and fastened thereto by means of bolt 63. In order to hold the head 24 by means of a crane or other suitable gripping and lifting means for support of the electrode 51, an eye bolt 64 (also see Fig. 4) is threadedly attached to the head 24 for such purpose. Directing attention now to Fig. 2, and having in mind the need for suitable introduction and distribution of cooling fluids on the outer surface of the liner 22, the transversely extending flange 13 is provided with the duct or passage 65 serving as the inlet for suitable cooling media, having connection with an elbow fitting 66 entering the cooling spirals welded or brazed to the outside of the funneled cylindrical member 22, thereby allowing for circulation therewithin and then through the entire system of coils, moving therefrom as at the elbow fitting 67 outwardly through the discharge duct 68. It will, of course, be understood that other suitable means for introducing the cooling media may be provided depending upon the nature of the installation and the source and character of media used. Similarly the form and number of coils or baffle arrangement employed on the exterior surface of the liner 22 may vary substantially from those shown at 58.

In actual operation of the electrode feed mechanism, it will now be apparent that upon predetermined rotation of the shaft or stem 35, the pinion 34 (driving gear) imparts rotatability to the gear 33 (driven gear). This movement in turn will rotate the elongated ring or flange support 45, the latter member being non-rotatably attached to the rotatable internally threaded sleeve 32 as previously described. It should, therefore, be clear also that rotation of the latter member will cause the drive bushing 31 threadedly attached thereto to be moved axially up or down depending upon the direction of said shaft rotation. This movement thereby causes the electrode supporting head 24 which is non-rotatably mounted relative to the bushing 31 to be actuated with the latter member upon the threads 30 of the liner 32. The said head is relatively guided within the liner 32 and held against relative rotation by means of the drive bushing 31 engageable by the pin 28 and also by respective upper and lower lugs oppositely disposed in different planes at 56 and 57. At the lower end of the housing 6 and within the flange 3, the roller bearings 69 guide the rotatable threaded sleeve 32 within the said base flange 3 (also see Figs. 5 to 7 inclusive).

As to the manner in which the electrode 51 is electrically heated and melted, this is accomplished by the electrical current flowing from the current supply cable 69 through the flange 13 through the radially extending ribs 21 to the stationary cylinder 22. Contact electrically is further conducted by means of the radially extending shoes 25 and 26 supplied with the said pin-form cables 74 and 71, the latter cables being connected as shown to the headpiece 24 and thus permitting the current to pass to the electrode coupling 49 and to the depending electrode 51. It will, of course, be understood that by means of the insulating members or linings, such as at 70, and also at 27, the remaining portions of the apparatus are protected against the electrical current transmitted to the electrode.

In making the electrical contact above referred to between the head generally designated 23 and the stationary cylinder 22 as well as to provide the desired compression for the upper and lower contact shoes 25 and 26 against the inner cylindrical wall surface of the cylinder 22, it will be noted that the springs 76 and 73 are provided for the purpose and mounted on the shoe-studs 75 and 72, respectively. The shoes 25 and 26 also carry suitable electrical current cables in the form of socketed pins as shown at 74 and 71, respectively.

In summary, it will be appreciated that a convenient, compact and efficient means has been provided for effecting an electrode drive for an arc melting furnace.

It will further be clear that the advantage of this design with the drive suitably cooled and extending around the electrode is therefore a relatively short overall length provided for the melting furnace. It is also furnished with an easy access to the electrode for replacement while supplying a desirable guide for the electrode during the course of its movement within the cooled liner.

While only a preferred embodiment has been shown and described, it should, of course, be appreciated that the invention may take forms in ways other than that illustrated. Therefore, it is the desire to be limited only by the invention as defined by the appended claims.

We claim:

1. In an electrode drive for an arc melting furnace or the like, the combination of an internally threaded driven cylinder, a drive bushing engaged with the said driven cylinder, head means for the electrode having means depending therefrom including an insulation pin engageable with said drive bushing for supporting the electrode, the said driven cylinder having oppositely disposed portions for receiving the said insulation pin, and means for cooling said cylinder.

2. In an electrode drive for an arc melting furnace or the like, the combination of an internally threaded driven cylinder, a slotted drive bushing threadedly engaged with the said driven cylinder, a head member within the said cylinder having means depending therefrom including an insulation pin engaging the slotted portion of the said bushing, the said driven cylinder having oppositely disposed recesses receiving the said insulation pin, and hollow means for cooling said cylinder.

3. In an electrode drive for an arc melting furnace or the like, the combination of a plurality of concentrically arranged elements, the latter including an electrode housing, an internally threaded driven cylinder, an insulating pin transversely mounted within said latter cylinder, a driving bushing engaged with the said driven cylinder, a stationary current-carrying cylinder within said housing, the said cylinder being slotted, means on said housing for placing an electrode in electrical contact with the said stationary cylinder, driven means within the said stationary cylinder, the electrode being suspended on the driven means by said pin, the said pin projecting through the said stationary cylinder slots, the said bushing being axially movable on the threads of said threaded cylinder upon rotation of the latter member whereby to effect the lengthwise movement of the electrode.

4. The subject matter of claim 3 including means for cooling the said current-carrying cylinder.

5. The subject matter of claim 3 including means disposed on the outer surface of the said current-carrying cylinder for distributing a cooling media over said latter member.

6. The subject matter of claim 1, the said cooling means including a closure for said housing having inlet and outlet means for effecting the circulation of a cooling media.

7. In an electrode drive or feed for an arc melting furnace or the like, the combination of concentrically arranged elements, the latter including an electrode housing, an internally threaded driving cylinder, a ring nut engaged with the said driving cylinder, a slotted stationary cylinder for carrying electrical current, longitudinally movable means engaging the slotted portion of said cylinder, slotted driven means within said cylinder for carrying an electrode in electrical contact with the stationary cylinder, an insulated pin pentrating the said stationary cylinder through the slotted portion of the latter member, and resilient means within said stationary cylinder for effecting the electrical contact for said driven means.

8. The subject matter of claim 7, the said driving cylinder being rotatable and having annular means thereon for effecting said rotation.

9. In an electrode drive for an arc melting furnace or the like, the combination of concentrically arranged elements, comprising an electrode housing, a rotatable internally threaded driving cylinder, a ring nut engaged with the said driving cylinder, a stationary current carrying cylinder having a slotted portion for a substantial part of its length, an electrode holder having radially disposed shoes in electrical contact with the stationary cylinder, axially movable driven means carrying the electrode, an insulating pin on said driven means, the electrode being suspended from said pin, the said pin engaging the slotted portion of said stationary cylinder, means disposed on a side of said housing for rotating said driving cylinder.

10. The subject matter of claim 9, the said cylinder rotating means including annularly disposed gear means on the rotatable driving cylinder.

11. The subject matter of claim 9 including means on an end portion of the said electrode housing for introducing cooling media to an outer surface of the said driving cylinder.

12. The subject matter of claim 3, including a base flange for supporting said driving cylinder against end thrust.

13. In an electrode drive for an arc melting furnace or the like, the combination of substantially concentrically arranged elements comprising an electrode housing, an internally threaded driving cylinder, a slotted ring nut within the cylinder engaging the threads of the said driving cylinder, a slotted stationary current carrying cylinder, a holder for an electrode having means for maintaining a sliding electrical contact with the stationary cylinder during its course of movement, the holder having a coupling for the electrode, an electrically insulated pin projecting through a wall of the stationary cylinder to engage the slotted portion of the said ring nut whereby upon rotation of said driving cylinder the said ring nut and electrode holder are axially moved on the threads of said driving cylinder.

14. The subject matter of claim 13, the said housing having actuating means cooperating with said driving cylinder to effect rotation of the said cylinder.

15. In an electrode drive for an arc melting furnace or the like, the combination of substantially concentrically arranged elements comprising an electrode housing, an internally threaded driving cylinder, a ring nut engaged with the threads of said driving cylinder, a slotted stationary current carrying cylinder with an electrode holder cooperating with the said stationary cylinder, the holder having electrical contact with the stationary cylinder, an electrically insulated pin carried by said holder, the said pin projecting through the stationary cylinder to engage the said ring nut, whereby upon rotation of said driving cylinder the lengthwise movement of said holder and electrode is obtained.

16. The subject matter of claim 15, the said housing having a fluid sealing means at an end portion thereof forming an electric insulating means for the said housing.

17. In an electrode drive for an arc melting furnace or the like, the combination of concentrically arranged elements comprising an electrode housing, an internally threaded driving cylinder supported on a base portion of said housing, a ring nut engaging the threads of the said driving cylinder, a stationary current carrying cylinder with means within the cylinder for maintaining an electrode in electrical contact with the stationary cylinder, transversely extending means on said last named means, the electrode being suspended from said transversely extending means, the ring nut being engaged by end limits of the said transversely extending means, and means exterior of the said housing and driving cylinder for actuating the said driving cylinder.

18. The subject matter of claim 17, including cooling means for the said internally threaded cylinder, the cooling means comprising coils disposed between said cylinder and housing.

References Cited in the file of this patent
UNITED STATES PATENTS

| | | |
|---|---|---|
| 597,945 | Bradley | Jan. 25, 1898 |
| 721,703 | Heroult | Mar. 3, 1903 |
| 2,686,825 | Southern | Aug. 17, 1954 |
| 2,686,826 | Paine | Aug. 17, 1954 |